Dec. 13, 1927.  
W. L. TANNER  
1,652,291  
INSECTICIDE AND METHOD OF APPLYING SAME  
Filed Oct. 1, 1921
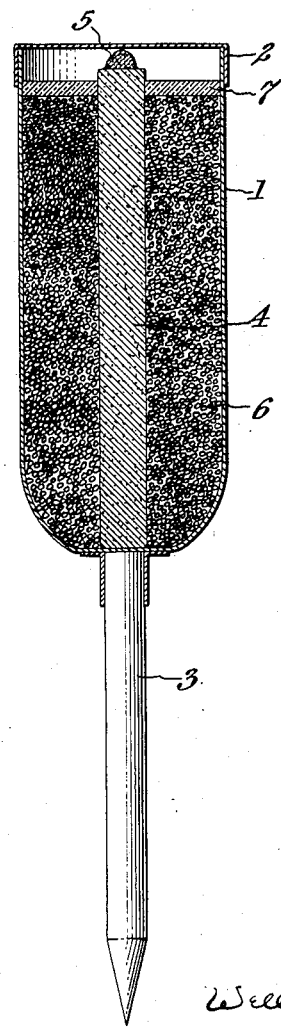

Patented Dec. 13, 1927.

1,652,291

UNITED STATES PATENT OFFICE.

WELLINGTON LEE TANNER, OF PANASOFFKEE, FLORIDA, ASSIGNOR TO THE GRASSELLI CHEMICAL COMPANY, OF CLEVELAND, OHIO, A CORPORATION OF OHIO.

INSECTICIDE AND METHOD OF APPLYING SAME.

Application filed October 1, 1921. Serial No. 504,611.

This invention relates to certain novel insecticidal or insecticidal and fungicidal compositions, and to the methods involved in their application to vegetation to be protected. The invention relates also to means or appliances useful in the application of the material.

Insecticidal and fungicidal compositions, in so far as they have been used in liquid form (in which term I include both solutions and suspensions) are commonly applied as a spray. While this method has proven effective in many cases, it is well recognized that it possesses certain limitations and disadvantages, among them the fact that the spray does ont effectively reach the lower surfaces of the leaves or protected crevices which often harbor insects. Attempts have been made to overcome this difficulty by the use of toxic gases, but such efforts have not been largely successful, excepting in specific instances, as for example in the use of cyanogen or hydrocyanic acid in the treatment of orange scale.

According to the present invention I depart entirely from the above-mentioned methods and employ as insecticides or fungicides (hereinafter referred to simply as "toxic agents") certain toxic compounds or substances which are solid or liquid at ordinary atmospheric temperatures,—i. e., at a temperature of from about 10° F. to about 100° F.,—but which may be converted into vapor or sublimed by sufficient application of heat; and I utilize the vapor phase of such toxic agents for the purpose of securing an effective distribution of the same over the entire area to be protected. Since the vapor phase in these compounds is a transitory condition, the toxic agents settle out or are condensed in the form of films or minute globules or particles upon the foliage, twigs or other parts of the tree or plant. With proper selection of the toxic agents it is possible in this way not only to protect wide areas at little expenditure of materials or labor, but to destroy insects or other pests which have already secured a foot-hold. With proper precautions as fully disclosed hereinafter, this may be accomplished without danger to human life, the concentration of the toxic agent in the atmosphere not exceeding the lethal limit.

It will of course be understood that it is necessary to select such toxic agents as are non-corrosive or non-injurious to the vegetation to be protected. Among the toxic agents which I have successfully used in the manner herein described are the following:—

Methyl dichloroarsine and methyl arsenious oxide, diphenyl chloro arsine and diphenyl arsenious oxide, phenarsazine chloride and oxide, triphenarsazine chloride and oxide.

It may be stated that the oxides are formed from the corresponding chlorides by hydrolysis.

The compounds above listed are included under the generic term organic trivalent arsenic compounds, and I have found in general that such compounds are effective insecticides and fungicides.

My invention is not limited to any particular means or devices for converting the toxic agent into the vapor phase, since any convenient means for applying the necessary heat in proximity to the point of application of the agent may be made to serve the purpose. I will, however, describe one novel manner in which I prefer to accomplish this result, referring to the accompanying drawings wherein the figure is a central vertical section of a convenient form of canister or package, carrying not only the toxic agent, or a composition capable of engendering such agent, but also the means for generating the heat necessary for its vaporization.

In said drawing, 1 represents a can or similar container which is preferably of light steel, provided with a cover 2 and with a spike or other projection 3 by which it may be held in upright position in the ground. 4 is a combustible core capable of liberating sufficient heat for the purpose in view: this may consist for example of a rod or strip of celluloid modified by the addition of say 4–12% of naphthalene. For convenience in lighting, a striking-head 5 of any suitable match composition may be provided. The annular space between the core and the walls of the can is filled with the toxic agent 6 comprising for example one or more of the bodies mentioned above, or any mixture capable of reacting under the influence of heat to evolve the toxic agent in vapor phase. One specific mixture which I have successfully used comprises approximately:

| | Parts by weight. |
|---|---|
| Methylamin hydrochlorid | 10 |
| Dimethylamin hydrochlorid | 6 |
| Phenarsazine chloride | 0.1–0.2 |
| Ammonium chloride | 2 |
| Bleaching powder | 10 |
| Sodium nitrite | 1 |

This mixture when subjected to the heat generated by the burning core evolves a heavy smoke or fume which spreads over the adjacent territory and through the foliage, and condenses or settles upon the vegetation. The reaction product is of course exceedingly complex, but tests have shown it to contain methyl- and dimethylamins, methyldichlor-amin, diphenylamin-chlor-arsine and diazo-methane, the last-named substance serving as a gaseous carrier for the condensible toxic agents. The fumes have proven entirely non-injurious to vegetation, but exceedingly destructive not only to insect life but to eggs and larvæ as well.

7 is a paraffin or similar seal which provides a hermetic closure for the contents of the package.

In order to secure the best results I prefer to evolve the toxic agents in absence of wind, and preferably at times of high humidity or when dew is present. In actual practice in the protection of orange groves, it has been found satisfactory to use 10 to 12 cans or "candles" per acre, individual candles containing in the neighborhood of 3 to 4 ounces of the above described reaction mixture.

It is to be understood that for the purposes of this invention it is not material whether the package contains the toxic agent itself, or such substances as will by a chemical reaction, yield or engender this toxic agent at the moment of use.

I claim:

1. The herein described insecticidal method, comprising vaporizing a condensable toxic agent comprising an organic trivalent arsenic compound in proximity to surfaces to be protected or freed from insects, whereby such surfaces receive a deposit of the condensed toxic agent.

2. The herein described insecticidal method comprising vaporizing a condensable toxic agent comprising a phenarsazine compound in proximity to surfaces to be protected or freed from insects, whereby such surfaces receive a deposit of the condensed toxic agent.

3. The herein described insecticidal method comprising vaporizing a condensable toxis agent comprising phenarsazine chloride in proximity to surfaces to be protected or freed from insects, whereby such surfaces receive a deposit of the condensed toxic agent.

4. An insecticidal appliance comprising in combination a closed container and a toxic agent therein, said toxic agent comprising an organic trivalent arsenic compound existing substantially in the non-gaseous phase at atmospheric temperatures but capable of passing into the vapor phase at higher temperatures and of being recondensed at lower temperatures without loss of toxic character.

5. An insecticidal appliance comprising in combination a container, combustible material, and a toxic agent comprising an organic trivalent arsenic compound existing substantially in the non-gaseous phase at atmospheric temperatures but capable of passing into vapor phase at higher temperatures and of being recondensed at lower temperatures without loss of toxic character.

6. As an insecticide, a normally solid organic trivalent arsenic compound capable of being sublimed without loss of its toxic character.

7. As an insecticide, a phenarsazine compound.

8. As an insecticidal agent, phenarsazine chloride.

In testimony whereof, I affix my signature.

WELLINGTON LEE TANNER.